Jan. 21, 1941.  E. C. DONTJE  2,229,497
SPIKING APPARATUS
Filed June 5, 1939  2 Sheets-Sheet 1
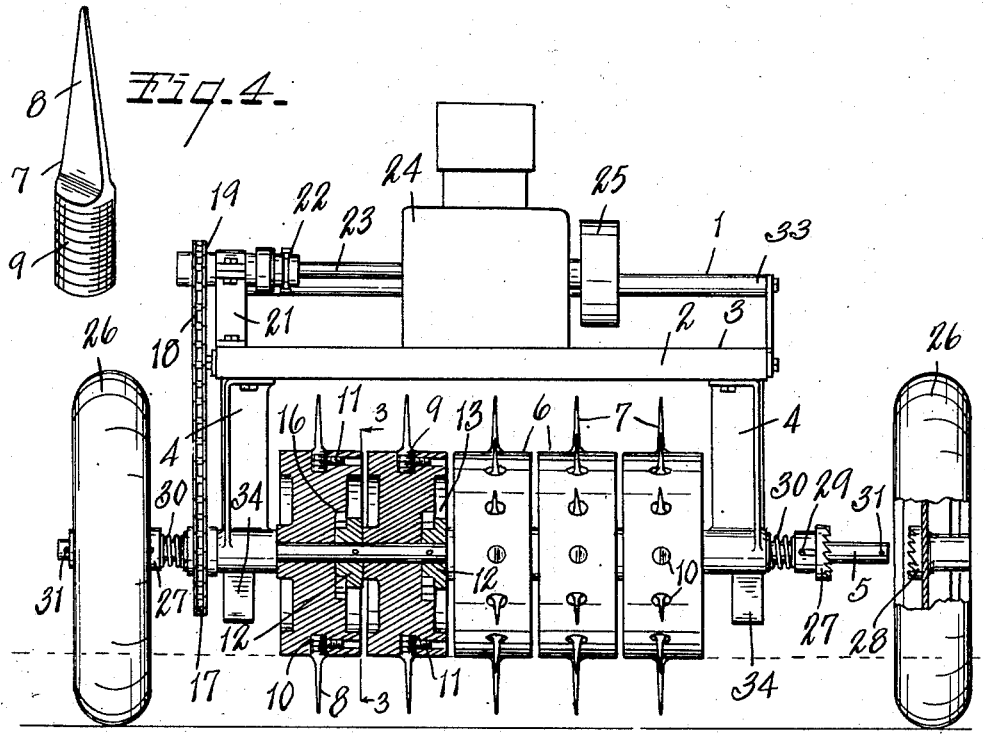
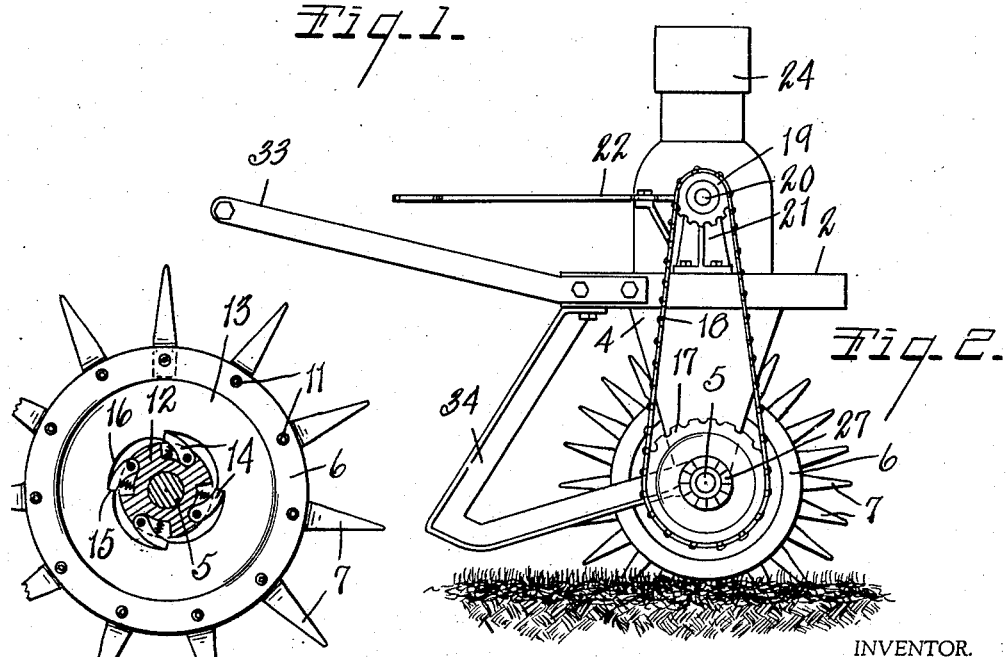
INVENTOR.
Emanuel Charles Dontje
BY Earl F. Chappell
ATTORNEYS

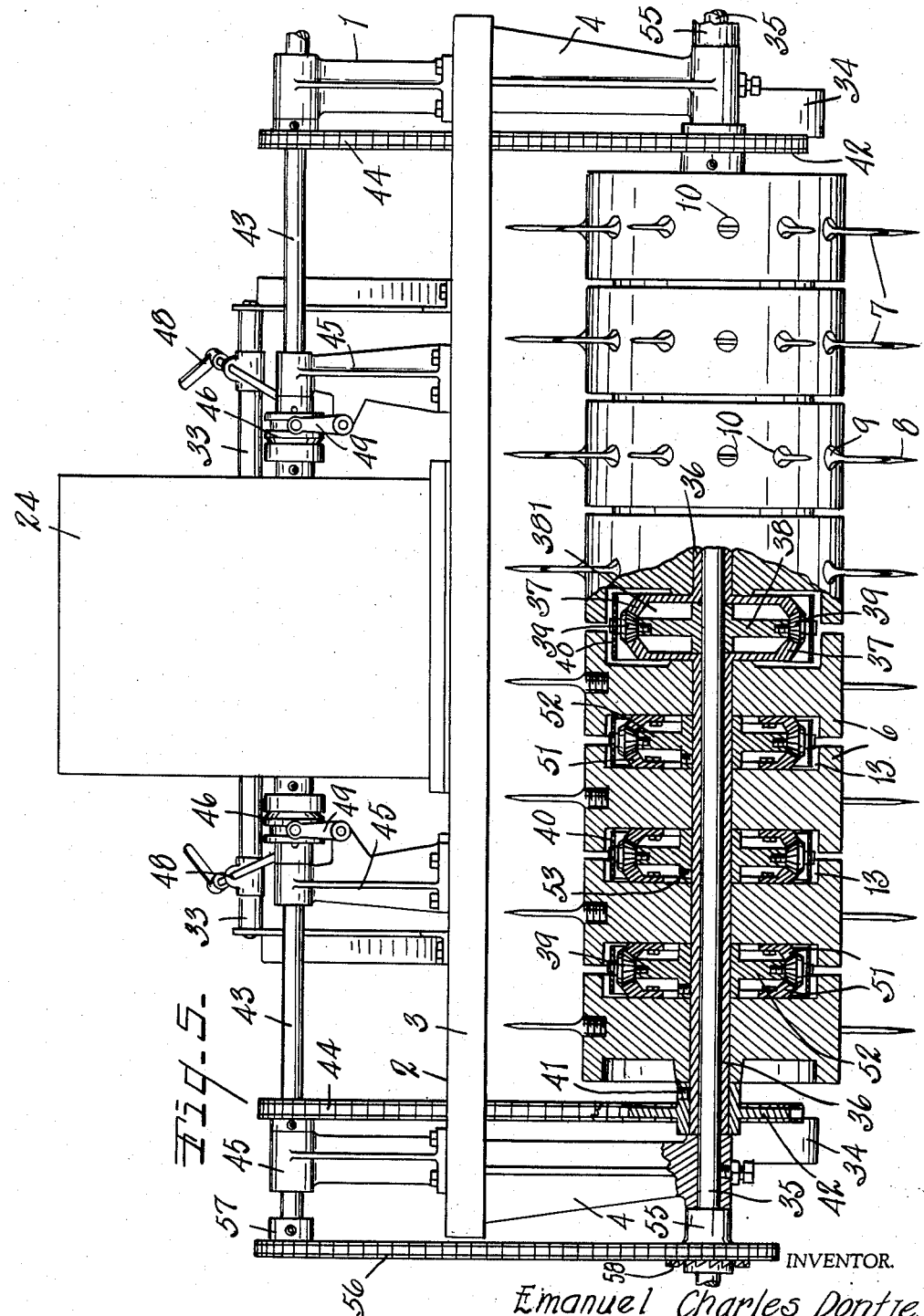

Patented Jan. 21, 1941

2,229,497

UNITED STATES PATENT OFFICE 2,229,497

SPIKING APPARATUS

Emanuel Charles Dontje, Kalamazoo, Mich.

Application June 5, 1939, Serial No. 277,337

17 Claims. (Cl. 97—52)

This invention relates to improvements in spiking apparatus.

The main objects of my invention are:

First, to provide an apparatus for cultivating, spiking, or disking putting greens, lawns, or the like, which is preferably motor driven, though it may be actuated manually if desired, and which has novel provisions for facilitating the manipulation of the same in use.

Second, to provide an apparatus of the type described, having a plurality of spike carrying drums and provisions for facilitating turning of the apparatus.

Third, to provide an apparatus of the type described adapted to exert an effective cultivating or loosening action on the matted roots of a putting green, being particularly useful for performing this operation on a bent grass green.

Fourth, to provide an apparatus of the type described, having novel provisions for rendering the same readily portable when not in actual operation.

Fifth, to provide an engine driven apparatus of the type described, having a plurality of cultivating drums and novel provisions therefor whereby turning of the apparatus may be effected without appreciable effort on the part of the operator.

Further objects relating to details and economies of my invention will definitely appear from the description to follow. The invention is defined in the claims.

A structure embodying the features of my invention is illustrated in the accompanying drawings, wherein:

Fig. 1 is a front elevational view of the device or apparatus of my invention partially broken away and in transverse vertical section with one of the transporting wheels mounted and the other removed to show structural details.

Fig. 2 is a side elevation of the apparatus of my invention, illustrating the operation of the same in use.

Fig. 3 is a fragmentary view in section on line 3—3 of Fig. 1.

Fig. 4 is a perspective view illustrating one of the removable teeth or spiking elements employed in my apparatus.

Fig. 5 is a fragmentary view in front elevation, partially broken away and in vertical transverse section, of a modified embodiment of the apparatus in accordance with my invention.

The present invention relates to a cultivating device for grass surfaces, being particularly designed for the cultivating or spiking of bent grass putting greens. In such surfaces, it is necessary to open the soil surface to aerate the turf to admit water, and facilitate the action of dressings such as chemicals and fertilizers, such manipulation having been found desirable in the prevention of brown patch and the destruction or prevention of other afflictions of the green.

In cultivating greens in the manner described, a spiking or knifing action is highly desirable, whereby the matted root of the grass is cut and stirred up by an oscillating movement of teeth or spikes penetrating the same. However, difficulty is experienced in performing this operation by means of a multiple spike tool or device caused by the general resistance to actuation of the tool whose spikes have a substantial penetration into the soil, and particularly by reason of the resistance to turning of the device. Accordingly, the present invention is particularly concerned with means for eliminating these difficulties and provides an apparatus which is highly effective in affording the desired cultivation and which is at the same time easily controlled by the operator.

Referring to the drawings, the reference numeral 1 in general indicates the apparatus of my invention, which consists of a frame 2 made up of a sturdy cross bar 3 from the lower side of which depend a pair of cast iron journal brackets or hangers 4 thereby constituting a U-shaped or forked carriage frame. Journaled in the brackets 4 is a shaft 5 extending transversely of the apparatus and projecting a substantial distance at each outer side of the brackets. Between the brackets, the aforesaid shaft 5 has rotatably mounted thereon a plurality of drums 6 each of which is provided with a number of axially alined circumferentially spaced removable cultivating teeth or spikes 7.

These spikes are illustrated clearly in Fig. 4 and consist of a thin knife-like pointed blade 8 and a circular threaded base 9 whereby the same are threadedly mounted in radial threaded recesses 10 in the drum, the axially extending set screws 11 threaded in the drum being utilized to clamp the spikes in final adjusted position with the sides of the thin blades 8 in parallel relation, as clearly illustrated in Fig. 1. In use, these spikes are adapted to penetrate the turf during rolling of the drums on the latter, as shown in Fig. 2, thereby cutting through and stirring up the matted roots and aerating the same, such cutting and stirring being caused by the knifing action of the spikes as they enter the turf at an angle then rotate about the point of engagement of the drums and turf. This stirring or cultivating action has been found very beneficial as mentioned above.

It is readily apparent that if the drums 6 were driven as a unit on the shaft 5, considerable difficulty would be experienced in turning the apparatus when the green or lawn or fairway had been traversed once. Accordingly, I provide means whereby, although in straight line spiking operation the drums are driven together positively as a unit, nevertheless when it is desired to reverse or turn the apparatus, such is readily possible. The aforesaid means consists of a plurality of pawl carrying collars or devices 12 spaced axially of the shaft and pinned thereto, these collars being accommodated in annular recesses 13 formed in the sides of the drums. Each collar has a plurality of pawls 14 pivoted thereon, see Fig. 3, there being in the illustrated embodiment four pawls spaced equally peripherally of each assembly. These pawls are suitably spring urged outwardly for driving engagement with a similar number of ratchet abutments 15 formed around a recess 16 in the drum 6, the latter recess communicating axially with the recess 13. Accordingly, it will be seen that upon forward actuation of the apparatus, the shaft 5 being driven in a manner to be described, the pawls 14 will engage the ratchet abutments 15 and drive the drums as a unit. However, upon turning of the drums about a radius of turning, those spaced distant from the center of the turning arc will rotate more rapidly than the nearer drums, with resultant overrunning of the pawl and ratchet drive connection. Thus the green will not be torn even when a sharp turn is made and the power required to effect the turn will not be excessive.

In order to positively drive the shaft 5, I mount thereon at one side of a bracket 4 a sprocket 17 about which a drive chain 18 is trained. This chain also passes around a driving sprocket 19 secured to a short shaft 20 which is rotatably mounted in a bearing 21 carried on the upper side of cross bar 33. The aforesaid shaft 20 is connected by a manually operable clutch 22 with the drive shaft 23 of a suitable engine 24, preferably of the internal combustion type. The reference numeral 25 designates the flywheel of this engine.

In addition to driving the drum shaft 5, engine 24 serves as a weight to force the spikes into the turf a desired distance, and if desired, the penetration of the spikes may be increased by the use of still further weights in a manner which will be obvious.

In order to permit ready transportation of the apparatus when not in use, I provide a pair of rubber tired wheels 26 adapted to be removably mounted on the extreme ends of the shaft 5 and, since it may be desirable to utilize the engine 24 to facilitate the aforesaid transportation, I provide means for drivingly engaging the shaft 5 with each of the wheels 26, in the form of pairs of coacting toothed clutch members 27, 28, the latter of which is coaxially secured to the wheel and the former of which is drivingly connected to the shaft by a pin and slot connection generally designated 29. Coil springs 30 surrounding the shaft between the clutch member 27 and bracket 4 serve the purpose of continually urging clutch members 27, 28 in driving engagement, while suitable pins receivable in apertures 31 on shaft 5 prevent endwise separation of the wheel and shaft due to spring 30.

Although the above described wheel arrangement is of substantial value for transporting the device, it should be clearly understood that in actual use the wheels are removed so that the spikes penetrate the turf in the manner illustrated in Fig. 2.

The frame cross bar 3 has secured thereto a rearwardly projecting handle 33 adapted to be held by the operator in guiding the apparatus, and in order to facilitate elevation of the drums 6 for removal or replacement of the wheels 26, I provide a pair of supports or jacks 34 of angle iron construction, which are bolted to the cross bar 3 and likewise secured integrally or otherwise to the cast carriage bearing brackets 4.

It is believed that no further description of the manner of operating the above described device is necessary. The engine drive for shaft 5 eliminates the need for substantial manual labor in traversing the machine across a green or lawn or other surface to be treated, which has hitherto been exceedingly great by reason of the penetrating engagement of the spikes. Moreover, reversing or turning of the apparatus is made possible without destructively tearing the green in the manner characterizing hitherto known spiking devices and, moreover, without excessive effort, it being merely necessary for the operator to restrain one side of the apparatus and permit the other to swing thereabout. The demountable wheels permit the device to be readily transported the relatively great distances between greens with the same facility which characterizes the operation of the device on the greens or, if desired, shaft 5 may be declutched from the engine drive therefor when it is desired to push or pull the device manually.

I have illustrated the spikes 7 as being axially and circumferentially alined on the drums and relative to shaft 5; however, it will be understood that if desired, the spikes may be staggered or the number thereof may be increased or decreased as is found necessary, the removable mounting of the spikes contributing to this end.

In Fig. 5, I illustrate a modified embodiment of my invention, wherein like elements are identified similarly by the reference numerals employed in Figs. 1 to 4 inclusive. In this embodiment, I provide a fixed shaft 35 secured to the brackets 4 and I rotatably mount on this shaft a pair of elongated tubular shafts or sleeves 36 of equal length. These shafts 36 have secured thereto at their adjacent ends, either integrally or otherwise, the mutually facing beveled toothed wheels or ring gears 37 and intermediate these gears I rotatably mount on shaft 35 a gear or pinion carrier 38. This member 38 has a plurality of bevel pinions or gears 39 rotatably mounted on its periphery in radial relation to the shaft, these pinions coacting with the beveled gears 37 in the manner of a differential drive. A casing 40 carried by the member 38 and surrounding the above described pinions and gears completes the main differential assembly 381 of the device located midway of shaft 35.

The drum 6 immediately on either side of the aforesaid main differential assembly are recessed at 13 to receive the same so as to maintain the equal axial spacing of the spikes on the device. There is an equal number of drums 6 grouped on either side of said main or primary center differential assembly 381 and my invention includes means for driving each group separately and independently of the other group for sharp turning or for positively driving both groups of drums together, as would be desirable on the straightaway. To this end, I provide means for positively driving each of the drum carrying sleeves 36 independently of the other, the group on one sleeve being freed from a positive drive when the other sleeve or shaft is driven and vice versa, by reason of the main differential. These positive shaft driving means are identical and accordingly only one thereof will be described, as follows: The shaft 36 has secured thereto by a set screw 41 a sprocket 42 which is drivingly connected to a clutch controlled drive shaft 43 by a chain 44. Shaft 43 is rotatably mounted in spaced bearings 45 on the upper side of cross bar 3 and is connected by manually controlled clutch 46 with the drive shaft of the engine 24. The manual controls 48 are provided to manipulate the clutch and are connected to a forked clutch shifting element 49 which is appropriately pivoted or otherwise carried on one of the brackets 45. The control extends rearwardly to a convenient point adjacent the operator's handle 33. There is a similar driving and controlling arrangement for each of the shafts 36.

Between each of the drums 6 of the groups on either side of the center of shaft 35 and disposed in recesses 13 formed in the said drums, I provide a secondary differential drive assembly consisting of a bevel ring gear 51 of mutually facing coaxial beveled ring gears 51 of equal diameter fixedly secured to the adjacent drums. Between each of these gears 51, I provide a pinion carrier 52 secured to shaft 36 by a set screw 53, and a plurality of pinions are rotatably mounted on the pinion carrier and mesh with the ring gears 51 to form a number of secondary differential drives. A sheet metal cover plate similar to the cover plate 40 completes each secondary driving assembly.

From the foregoing, it will be apparent that by engagement of both of the engine drive shaft clutches 46, it is possible to positively drive all of the drums 6 at equal speed, the various differential drive connections primarily or secondarily readily accommodating slight curves arising in the operation of the apertures and necessitating the angular travel of certain drums at greater speed than others. When it is desired to effect a sharp turn, however, the operator merely manipulates one of the controls 48 to disengage one of the clutches 46 and thereby place an entire corresponding group of drums in idling relation to the shaft 36, whereupon the driven group causes the apparatus to swing about the idling group with the various differential drive connections permitting differing speeds due to the different arcs traversed by the drums. In this embodiment, it is necessary to exert only the very slightest guiding action on the apparatus in turning the same, and with only slight practice an operator can manipulate the apparatus through the most intricate path by operating controls 48 in the proper manner.

The above described embodiment also includes transporting wheels similar to those illustrated in Fig. 1, but not shown in Fig. 5, these wheels being preferably rotatably mounted on the ends of shaft 35 and being separately driven by the sprockets 55 which are also rotatably on shaft 35 exteriorly of the brackets 4. These sprockets are driven by separate chains 56 from drive sprockets 57 secured to the clutch controlled shafts 43. The wheel driving sprockets 55 on shaft 35 have clutch teeth 58 thereon coacting with similar clutch teeth on the wheels, which are, as a matter of fact, identical with the wheels illustrated in Fig. 1.

The modification of Fig. 5 has all of the advantages characterizing that illustrated in Figs. 1, 2 and 3, with the further important feature that it may be provided with a greater number of axially arranged drums and still effect a completely satisfactory turning of the device without objectionably disturbing the green surface or causing unusual difficulty in manipulating the same.

I have illustrated and described my improvements in embodiments which are very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent is:

1. A cultivating device for lawn surfaces, putting greens, and the like, comprising a carriage, a plurality of axially alined spike carrying drums rotatably mounted on said carriage, a rotatable driven element rotatably mounted on the carriage, and means for driving said drums positively as a unit from said element and for permitting idling rotation of the drums relative to one another in turning the apparatus, comprising a plurality of pawl devices fixed to said element in alinement axially thereof, pawls pivotally mounted on said devices, and ratchet members on said drums engageable with said pawls to effect rotation in one direction of the drums from the driven element, means for driving said element comprising a prime mover mounted on said carriage and driving connections from said prime mover to said element, and means for transporting said apparatus when desired with the spikes on said drums elevated above the said surface, comprising wheels adapted to be removably mounted on the element and means for driving said wheels from said element.

2. A cultivating device for lawn surfaces, putting greens, and the like, comprising a carriage, a plurality of axially alined spike carrying drums rotatably mounted on said carriage, a rotatable driven element rotatably mounted on the carriage, and means for driving said drums positively as a unit from said element and for permitting idling rotation of the drums relative to one another in turning the apparatus, comprising devices fixed to said element and having one-way driving engagement with said drums, means for driving said element comprising a prime mover mounted on said carriage and driving connections from said prime mover to said element, and means for transporting said apparatus when desired with the spikes on said drums elevated above the said surface, comprising wheels adapted to be removably mounted on the carriage, and means for driving said wheels from prime mover.

3. A cultivating device for lawn surfaces, putting greens, and the like, comprising a wheelbarrow type carriage having a rearwardly extending control handle for guiding the same, a plurality of axially alined spike carrying drums rotatably mounted on said carriage, a rotatable driven element rotatably mounted on the carriage, and means for driving said drums positively as a unit from said element and for permitting idling rotation of the drums relative to one another in turning the apparatus, comprising a plurality of pawl carriers fixed to said element in alinement axially thereof, pawls pivotally mounted on said carriers, and ratchet members on said drums engageable with said pawls to effect rotation of the drums from the driven element, and means for driving said element during translation of the carriage, and manually actuable control means for said driving means extending rearwardly of said drums in the direction of said handle.

4. A cultivating apparatus of the type described, comprising a carriage, a prime mover on said carriage, a supporting member extending transversely of the carriage, a pair of driven members rotatably mounted on said supporting member, separate means for driving said driven members from said prime mover including clutch means for controlling said driving means, differential means for connecting said driven members for movement as a unit when both said driving means are actuated and for permitting relative movement of the driven members when only one of the driving means is actuated, comprising a pinion carrier rotatable on said supporting member, pinions rotatable on said carrier, and gears on adjacent ends of said driven member meshing with said pinions, said differential means being disposed centrally of said supporting member, spike carrying drums rotatably mounted on said driven members, there being a group of drums on either side of said differential means, and further differential means on said driven members for driving the drums of each group at equal or varying speeds relative to one another and the driven member therefor on the straightaway and in turning respectively, either of said clutch controlled driving means being disengageable to cause the other to effect turning of the apparatus by driving and swinging the corresponding driven member and its group of drums about the undriven group.

5. A cultivating apparatus of the type described, comprising a wheelbarrow type carriage having a rearwardly extending control handle for guiding the same, a prime mover on said carriage, a supporting member extending transversely of the carriage, a pair of driven members rotatably mounted on said supporting member, separate means for driving said driven members from said prime mover including clutch means for controlling said driving means, a control element connected to said clutch means and extending rearwardly in the direction of said handle for manual actuation, differential means for connecting said driven members for movement as a unit when both said driving means are actuated and for permitting relative movement of the driven members when only one of the driving means is actuated, said differential means being disposed centrally of said supporting member, cultivating drums rotatably mounted on said driven members, there being a group of drums on either side of said differential means, and further differential means on said driven members for driving the drums of each group at equal or varying speeds relative to one another and the driven member therefor on the straightaway and in turning respectively, either of said clutch controlled driving means being disengageable to cause the other to effect turning of the apparatus by driving and swinging the corresponding driven member and its group of drums about the undriven group.

6. A cultivating apparatus of the type described, comprising a wheelbarrow type carriage having a rearwardly extending control handle for guiding the same, a prime mover on said carriage, a supporting member extending transversely of the carriage, a pair of driven members rotatably mounted on said supporting member, means for driving said driven members when said carriage is translated, control means for said driving means connected thereto and extending rearwardly in the direction of said handle for manual actuation, differential means for connecting said driven members for movement as a unit or for permitting relative movement of the driven members, cultivating drums rotatably mounted on said driven members, and further differential means on said driven members for driving the drums of each group at equal or varying speeds relative to one another and the driven member therefor on the straightaway and in turning respectively.

7. A cultivating apparatus of the type described, comprising a wheelbarrow type carriage having a rearwardly extending control handle for guiding the same, a prime mover on said carriage, a driven member rotatably mounted on said carriage, means for driving said driven member from said prime mover including clutch means for controlling said driving means, a manual control element connected to said clutch means and extending rearwardly in the direction of said handle for manual actuation, spike carrying drums rotatably mounted on said driven member, means for positively driving said drums from said driven member as a unit or for permitting relative movement thereof, a plurality of removable wheels for said carriage adapted to elevate the spikes on said drums above the surface traversed by the carriage, and means for drivingly connecting said wheels with said prime mover.

8. A cultivating apparatus of the type described, comprising a wheelbarrow type carriage having a rearwardly extending control handle for guiding the same, a prime mover on said carriage, a driven member rotatably mounted on said carriage, means for driving said driven member from said prime mover including clutch means for controlling said driving means, a manual control element connected to said clutch means and extending rearwardly in the direction of said handle for manual actuation, spike carrying drums rotatably mounted on said driven member, and means for positively driving said drums from said driven member as a unit or for permitting relative movement thereof.

9. A cultivating apparatus comprising a plurality of axially alined drums provided with circumferentially alined spaced knife-like spikes, a shaft upon which said drums are rotatably mounted, a wheelbarrow type carriage having a rearwardly extending control handle for guiding the same, means for rotatably mounting said shaft on the carriage, a prime mover on the carriage, clutch controlled means for driving said shaft from the prime mover, a manual control element connected to said clutch means and extending rearwardly in the direction of said handle for manual actuation, and overrunning clutch means for driving said drums with the shaft, comprising a plurality of pawl assemblies secured to said shaft in spaced relation adjacent the drums thereon, pawls pivotally mounted on said assemblies, and ratchet members on the drums engageable by the respective pawls, said overrunning clutch means permitting ready turning of the apparatus when desired, said drums normally rolling over the turf in operation to cause said spikes to penetrate and agitate the turf and the roots thereof, and means for transporting said carriage with the spikes in spaced relation to the turf, comprising a pair of wheels removably mountable on said carriage shaft, and means for drivingly connecting said wheels for movement with the shaft.

10. A cultivating apparatus comprising a plurality of axially alined drums provided with circumferentially alined spaced knife-like spikes, a shaft upon which said drums are rotatably mounted, a wheelbarrow type carriage having a rearwardly extending control handle for guiding the same, means for rotatably mounted said shaft on the carriage, a prime mover on the carriage, clutch controlled means for driving said shaft from the prime mover, including a control element connected to said clutch controlled means and disposed relative to said handle for manual actuation, and overrunning drive means for driving said drums with the shaft, and permitting ready turning of the apparatus when desired, said drums normally rolling over the turf in operation to cause said spikes to penetrate and agitate the turf and the roots thereof, and means for transporting said carriage with the spikes in spaced relation to the turf, comprising a pair of wheels removably mountable on said carriage shaft, and means for drivingly connecting said wheels for movement with the shaft.

11. A cultivating apparatus comprising a plurality of axially alined drums provided with circumferentially alined spaced knife-like spikes, means for removably mounting said spikes in the drums, a shaft upon which said drums are rotatably mounted, a carriage, means for rotatably mounting said shaft on the carriage, means for driving said shaft, and overrunning drive means for driving said drums with the shaft and permitting ready turning of the apparatus when desired, said drums normally rolling over the turf in operation to cause said spikes to penetrate and agitate the turf and the roots thereof, and means for transporting said carriage with the spikes in spaced relation to the turf, comprising a pair of wheels removably mountable on said carriage shaft, and yieldable coacting clutch means on said wheels and shaft for drivingly connecting said wheels for movement with the shaft.

12. In an apparatus of the class described, the combination with a carriage, a driven shaft constituting an axle for the carriage, a plurality of drums rotatably mounted on said shaft and each provided with a plurality of radially disposed flattened teeth arranged with their edges in the plane of rotation, and overrunning drive members for connecting each of said drums with said shaft.

13. In an apparatus of the class described, the combination with a wheelbarrow type carriage having a rearwardly extending handle for guiding the same, a driven shaft constituting an axle for the carriage, a plurality of drums rotatably mounted on said shaft and each provided with a plurality of radially disposed teeth, and overrunning drive members for connecting each of said drums with said shaft.

14. In an apparatus of the class described, the combination with a frame, a shaft on which said frame is mounted, a motor on said frame having driving connection with said shaft, a plurality of drums rotatably mounted on said shaft and each provided with a plurality of radially disposed spiking teeth, pawl carriers rotatively mounted on said shaft, said drums being recessed to receive said pawl carriers, the recesses being provided with ratchet teeth, each pawl carrier being provided with a plurality of pawls coacting with said ratchet teeth, said ratchet driving connection for said shaft to said drums permitting individual overrunning rotation of the drums relative to the shaft.

15. In an apparatus of the class described, the combination with a frame, a shaft on which said frame is mounted, a motor on said frame having driving connection with said shaft, a plurality of drums rotatably mounted on said shaft and each provided with a plurality of radially disposed spiking teeth, and individual ratchet driving connections for said drums to said shaft, said ratchet driving connections permitting individual overrunning rotation of the drums relative to the shaft.

16. In an apparatus of the class described, the combination of a supporting shaft, a pair of driven tubular shafts mounted thereon, means including differential speed driving connections for rotating said tubular shafts, a plurality of drums having opposed recesses in their sides rotatably mounted on said tubular shafts, and differential gear assemblies interposed in the recesses between the adjacent drums of each driven shaft comprising driven gear elements secured to the tubular shafts and having planetary gears mounted thereon, and coacting gears mounted on the drums.

17. In an apparatus of the class described, the combination of a pair of driven shafts, means including differential speed driving connections for rotating said driven shafts, a plurality of drums rotatably mounted on each of said driven shafts, and differential gear assemblies interposed between the adjacent drums on each shaft comprising driven elements secured to the shafts and having planetary gears mounted thereon, and coacting gears mounted on the adjacent drums.

EMANUEL CHARLES DONTJE.